United States Patent
Bunnell

(10) Patent No.: US 11,727,638 B1
(45) Date of Patent: Aug. 15, 2023

(54) ADAPTIVE GEOMETRIC SMOOTHING

(71) Applicant: Meta Platforms Technologies, LLC, Menlo Park, CA (US)

(72) Inventor: Michael Bunnell, Pleasanton, CA (US)

(73) Assignee: Meta Platforms Technologies. LLC, Menlo Park, CA (US)

( * ) Notice: Subject to any disclaimer, the term of this patent is extended or adjusted under 35 U.S.C. 154(b) by 352 days.

(21) Appl. No.: 16/999,797

(22) Filed: Aug. 21, 2020

(51) Int. Cl.
  *G06T 17/20* (2006.01)
  *G06T 15/20* (2011.01)
  *G02B 27/01* (2006.01)
  *G06T 19/00* (2011.01)

(52) U.S. Cl.
  CPC ........ *G06T 17/205* (2013.01); *G02B 27/0172* (2013.01); *G02B 27/0179* (2013.01); *G06T 15/205* (2013.01); *G06T 19/006* (2013.01); *G02B 2027/0185* (2013.01)

(58) Field of Classification Search
  None
  See application file for complete search history.

(56) References Cited

U.S. PATENT DOCUMENTS

| | | | | |
|---|---|---|---|---|
| 5,966,133 A | * | 10/1999 | Hoppe | G06T 17/20 345/420 |
| 2021/0174596 A1 | * | 6/2021 | Zhang | G06F 9/547 |

OTHER PUBLICATIONS

Author: Yang et al.; Title: A Progressive View-Dependent Technique for Interactive 3-D Mesh Transmission; Date: Nov. 2004; Source: https://ieeexplore.ieee.org/document/1347194 (Year: 2004).*

* cited by examiner

*Primary Examiner* — Jwalant Amin
(74) *Attorney, Agent, or Firm* — Baker Botts L.L.P.

(57) ABSTRACT

In one embodiment, a computing system may display, to a viewer, a virtual surface rendered based on a first mesh of the virtual surface. In response a trigger condition, the system may generate a second mesh for the virtual surface based at least on a distance of the viewer to the virtual surface. The second mesh may include at least one new vertex with respect to the first mesh. The new vertex may be associated with a target position. The system may determine a starting position on the first mesh corresponding to the new vertex of the second mesh. The system may generate a sequence of frames depicting the virtual surface undergoing a progressive transition process using a progressively-changing mesh with a progressively-changing vertex that corresponds to the new vertex. The progressively-changing vertex may progressively move from the starting position to the target position during the progressive transition process.

18 Claims, 13 Drawing Sheets

ADAPTIVE GEOMETRIC SMOOTHING

TECHNICAL FIELD

This disclosure generally relates to computer graphic technologies, particularly to artificial reality, such as virtual reality and augmented reality.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods for generating a smooth transition visual effect for re-rendering a virtual surface with a different level of details. The AR/VR system may render a virtual surface with a first level of details suitable to be viewed for a viewer from a first distance. The virtual surface with the first level of details may be rendered using a mesh surface generated based on a first mesh having a first mesh density. When the viewer moves closer to the virtual surface, the system may need to render the virtual surface with a higher level of details. To achieve that, the system may track the distance (in the virtual space) between the viewer and the virtual surface and compare this distance to a pre-determined threshold. In response to a determination that the distance between the viewer and the virtual surface is smaller than the pre-determined threshold, the system may generate a target mesh surface with a higher level of details as the representation of the ideal target surface. The target mesh surface may be generated by a tessellation algorithm based on a surface model, the distance to the viewer, the viewpoint of the viewer, and the field of view of the viewer. The target mesh surface may be generated based on a target mesh with a higher density than the first mesh of the virtual surface. However, the system may not immediately render and display the target mesh surface since doing so would cause an abrupt change in visual effect to the viewer.

Instead, the system may generate a sequence of frames depicting the virtual surface undergoing a progressive transition process using a progressively-changing mesh with progressively-changing vertices that correspond to the new vertices of the target mesh. The progressively-changing vertices may progressively move from respective starting positions to corresponding target positions during the progressive transition process. For example, the system may generate an intermediate mesh surface which initially appears to be the same as the original mesh surface but is rendered based on an intermediate mesh having the same mesh density with the target mesh. Over time, the intermediate mesh surface would transition progressively to appear more like the target mesh surface. The intermediate mesh surface may be rendered based on an intermediate mesh generated by a linear interpolation algorithm. The intermediate mesh may have the same mesh density with the target mesh surface, and therefore, have more vertices than the original mesh. The starting positions of each new vertex (with respect to the original mesh) of the intermediate mesh may be determined based on a linear interpolation on two or more vertices of the original mesh. The attributes (e.g., normal and lighting conditions) associated with respective new vertices may be determined using linear interpolation based on respective attributes of associated vertices. The intermediate mesh may have the same number of mesh areas (e.g., triangles, quadrilaterals, polygons, etc.) as the target mesh but may have the new vertices initially aligned to the original mesh surface rather than the target mesh surface. The system may generate a mesh data structure for storing the target mesh. The mesh data structure may include target positions, which are on the target mesh surface, and respective starting positions, which are on original mesh surface, for the new vertices of the target mesh. The system may gradually transform the intermediate mesh surface into the target mesh surface during a predetermined period of time (e.g., 0.5 seconds, 1 second) to generate a smooth transition visual effect. The transformation process may include gradually moving each new vertex from its starting position, which is on the original mesh surface, to the corresponding target position, which is on the target mesh surface. As a result, the original mesh surface may be transformed into the target mesh surface (which is rendered based on a denser mesh and has a higher level of details) gradually with a smooth transition visual effect and without abrupt changes to the viewer.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
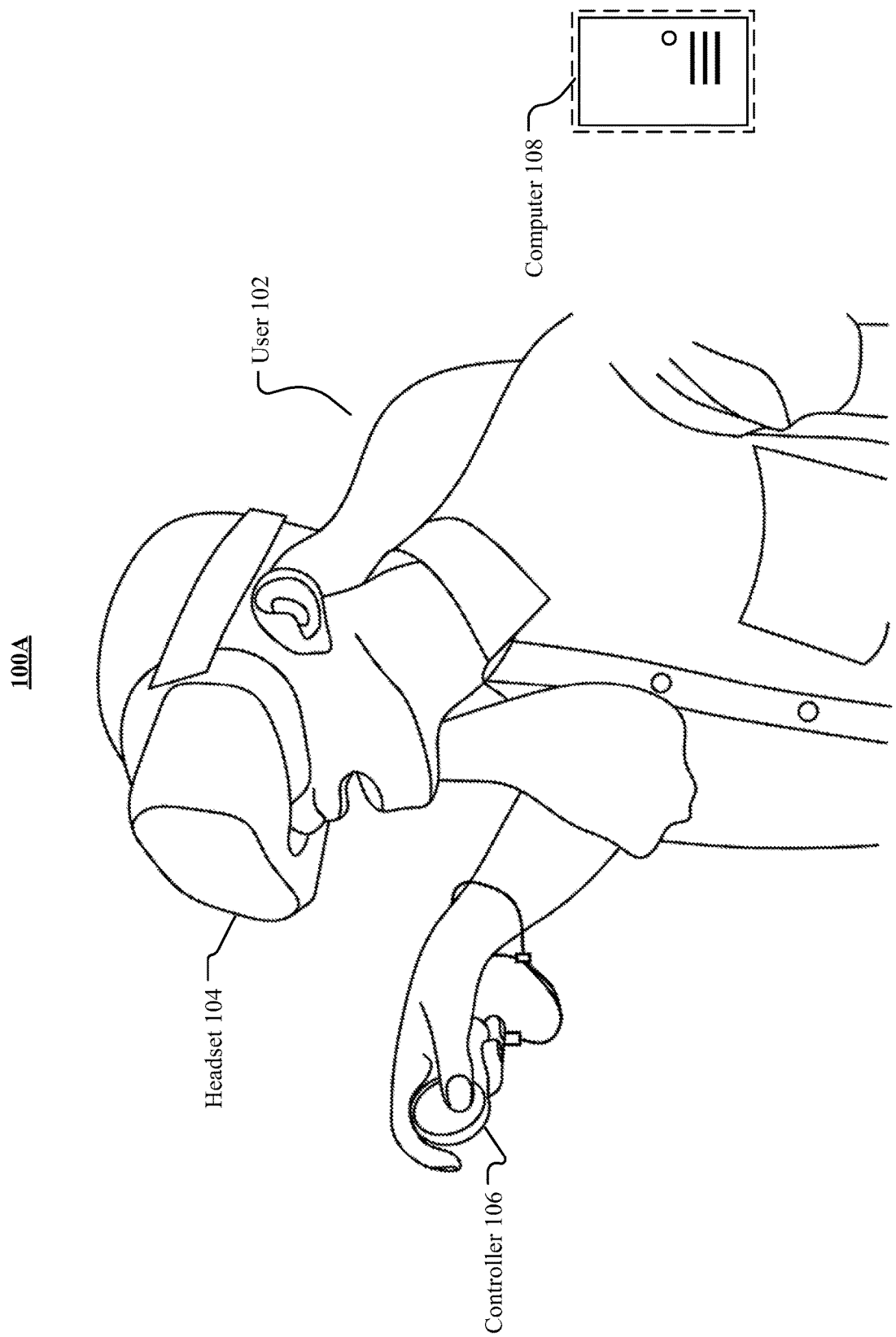
FIG. 1A illustrates an example artificial reality system.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
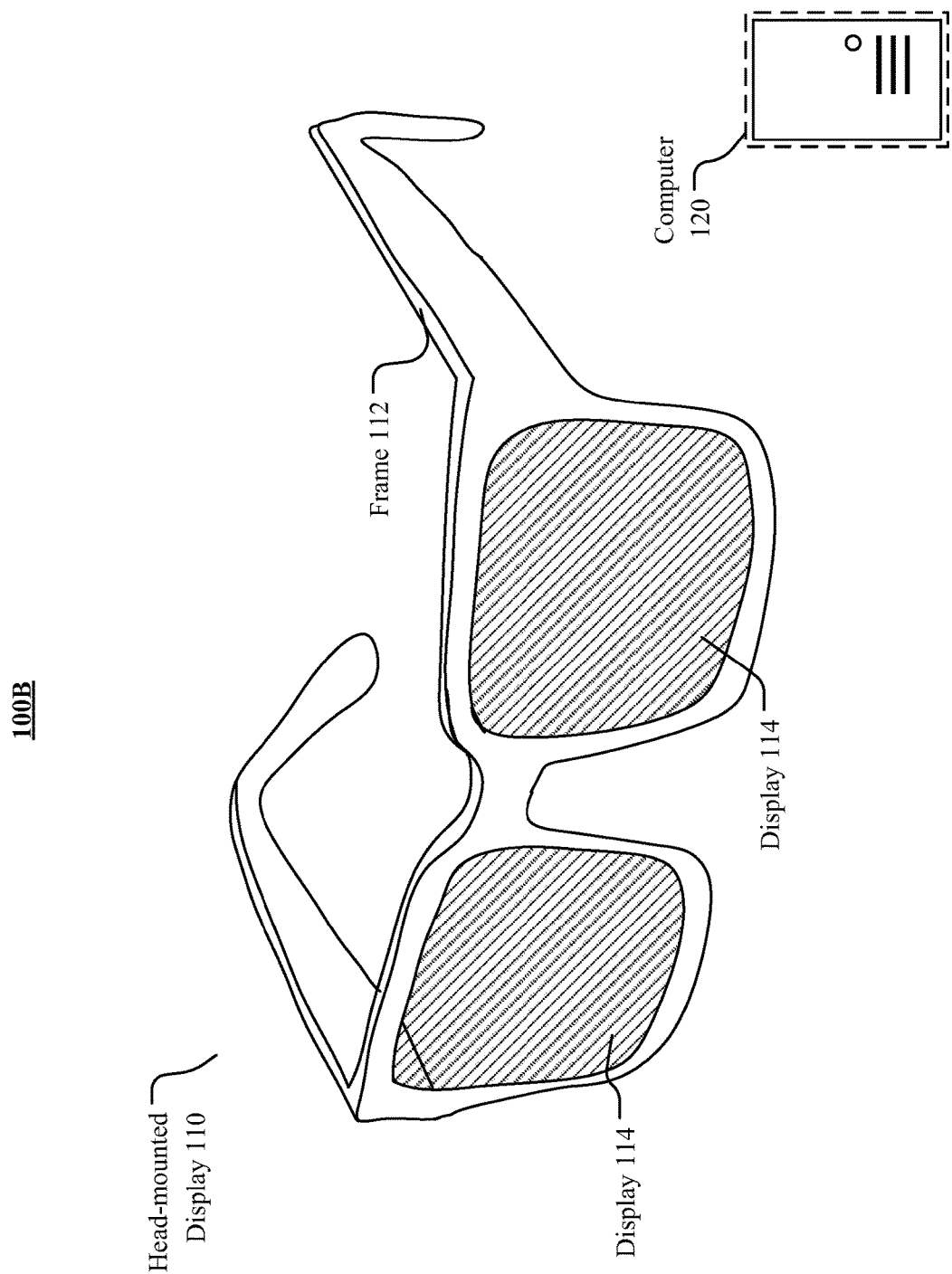
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
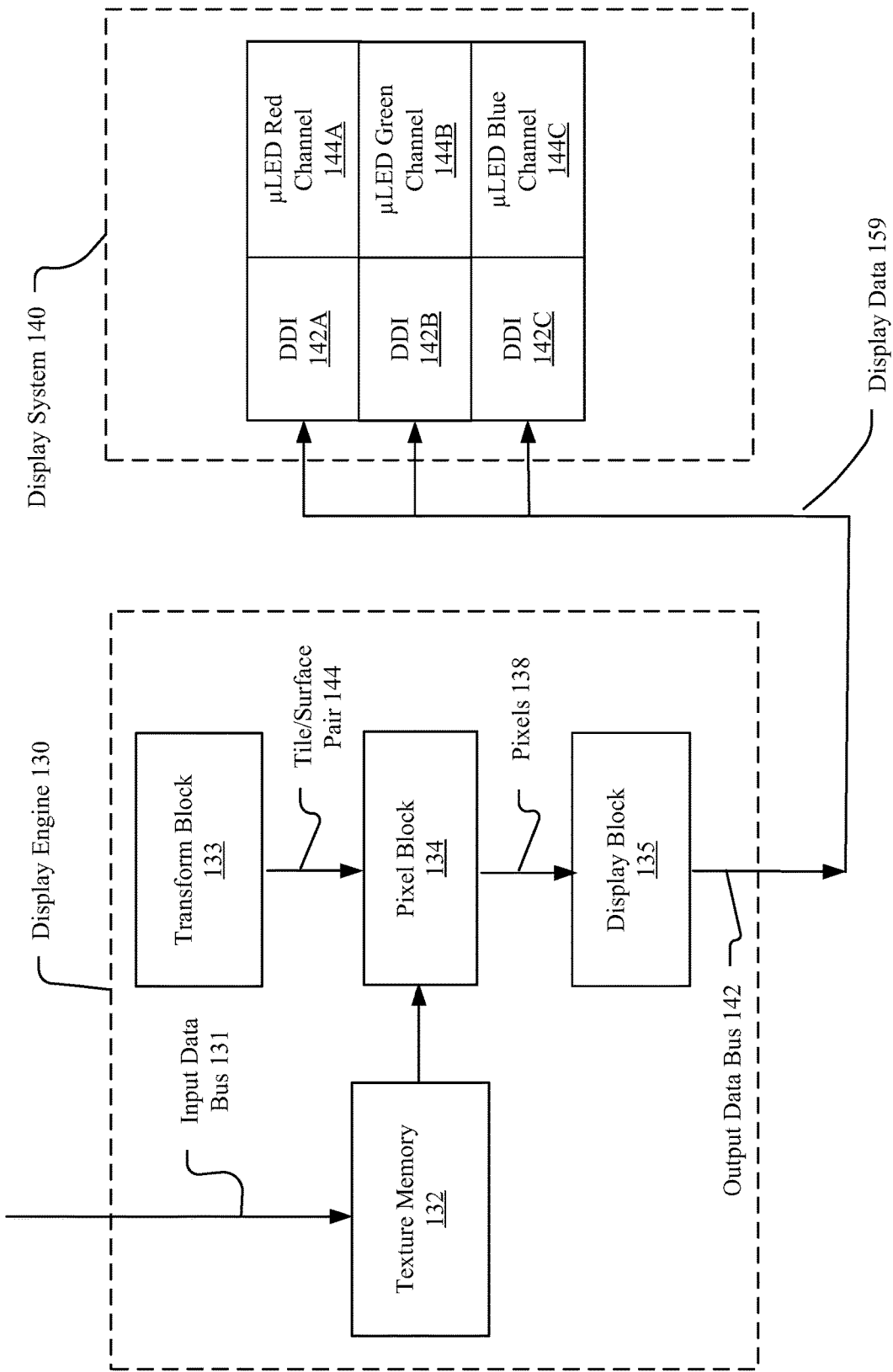
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded in to the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (μLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatio-temporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (DDIs) (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), etc.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

Figure 1D:
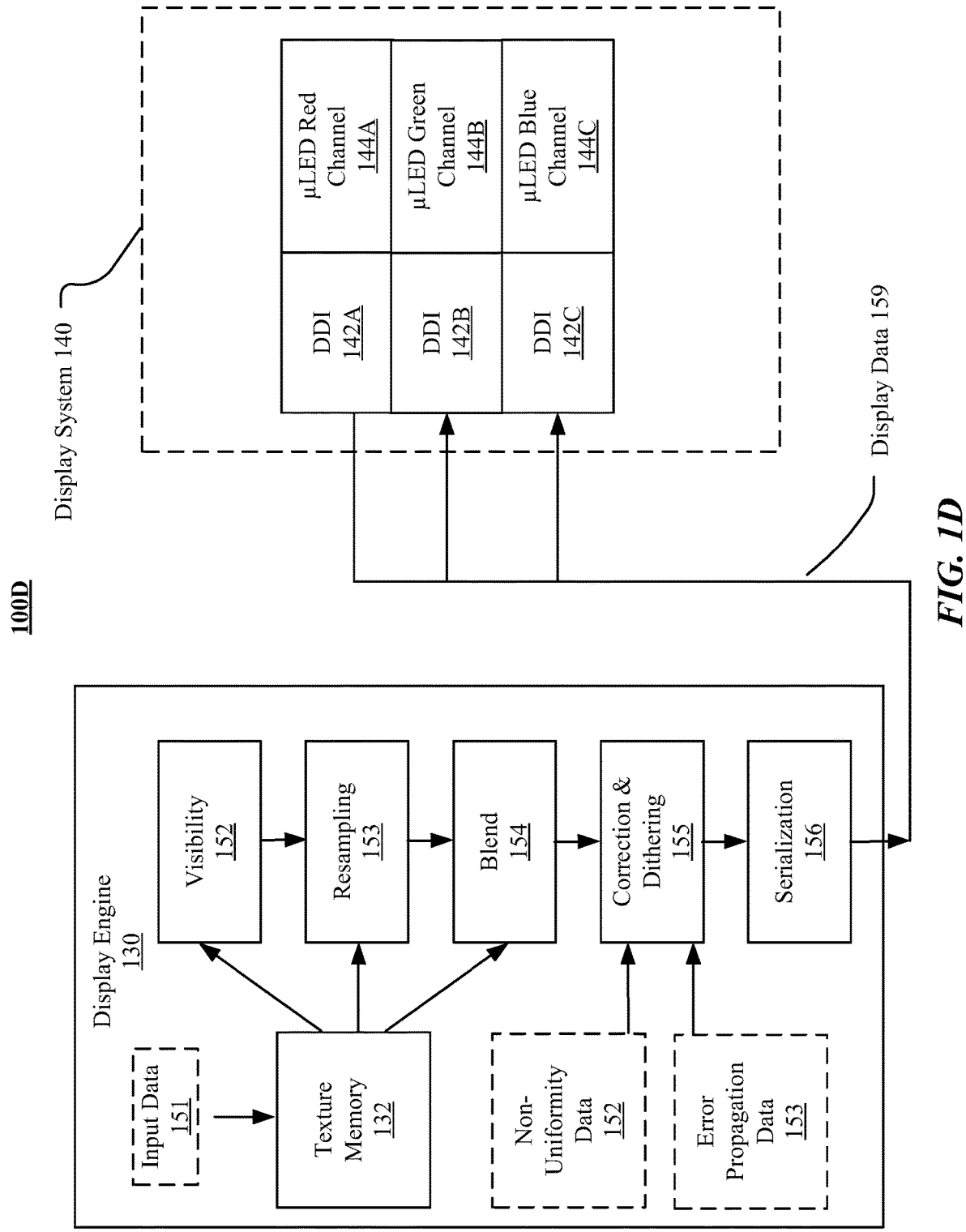
FIG. 1D illustrates an example graphic pipeline of the display engine for generating display image data.

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C) of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values, perform one or more dithering algorithms for dithering the quantization errors both spatially and temporally, serialize the pixel values for scanline output for the physical display, and generate the display data 159 suitable for the display system 140. The display engine 130 may send the display data 159 to the display system 140. In particular embodiments, the display system 140 may include three display driver ICs (e.g., 142A, 142B, 142C) for the pixels of the three color channels of RGB (e.g., 144A, 144B, 144C).

Figure 2A:
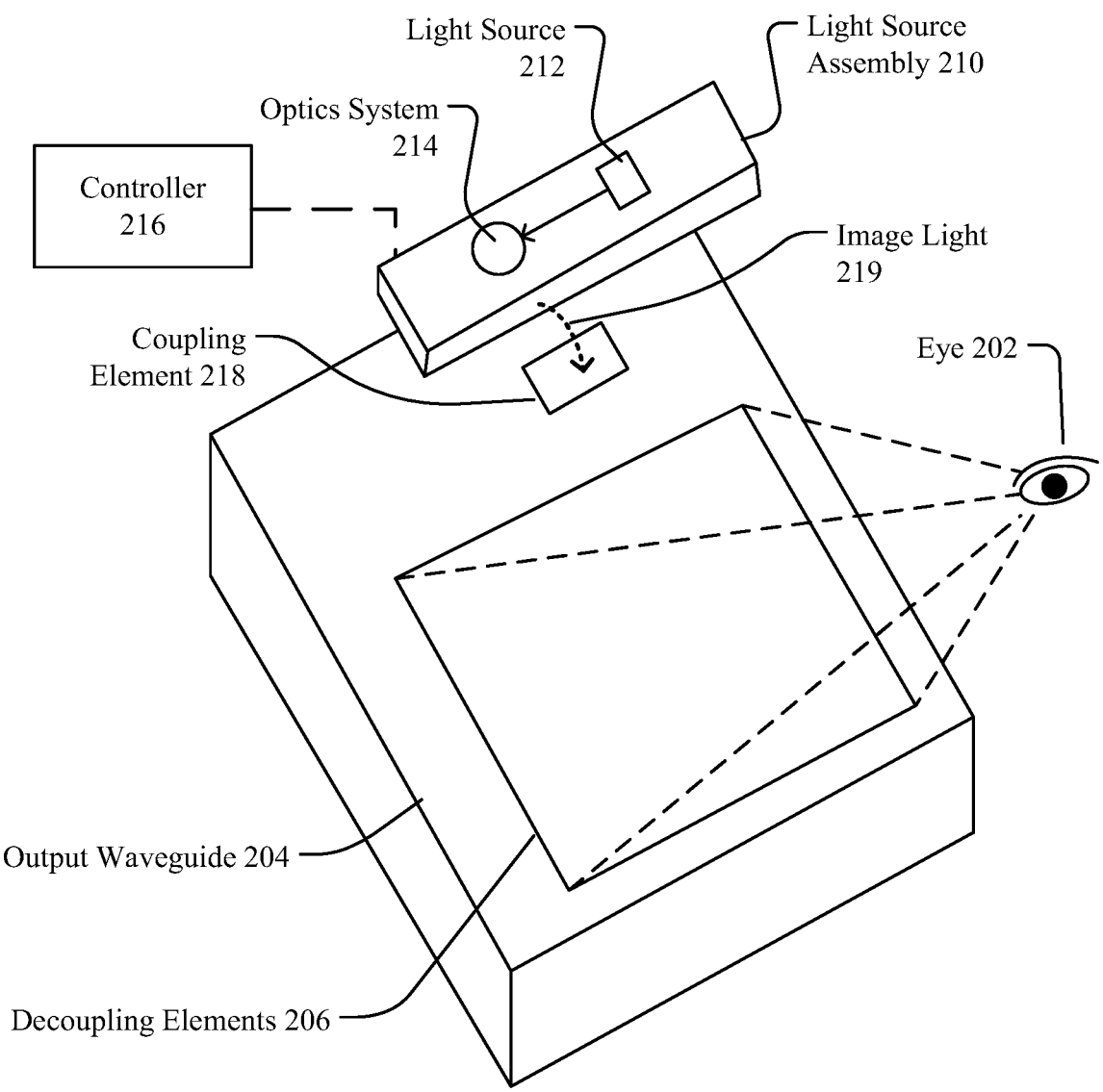
FIG. 2A illustrates an example scanning waveguide display.
Figure 3A:
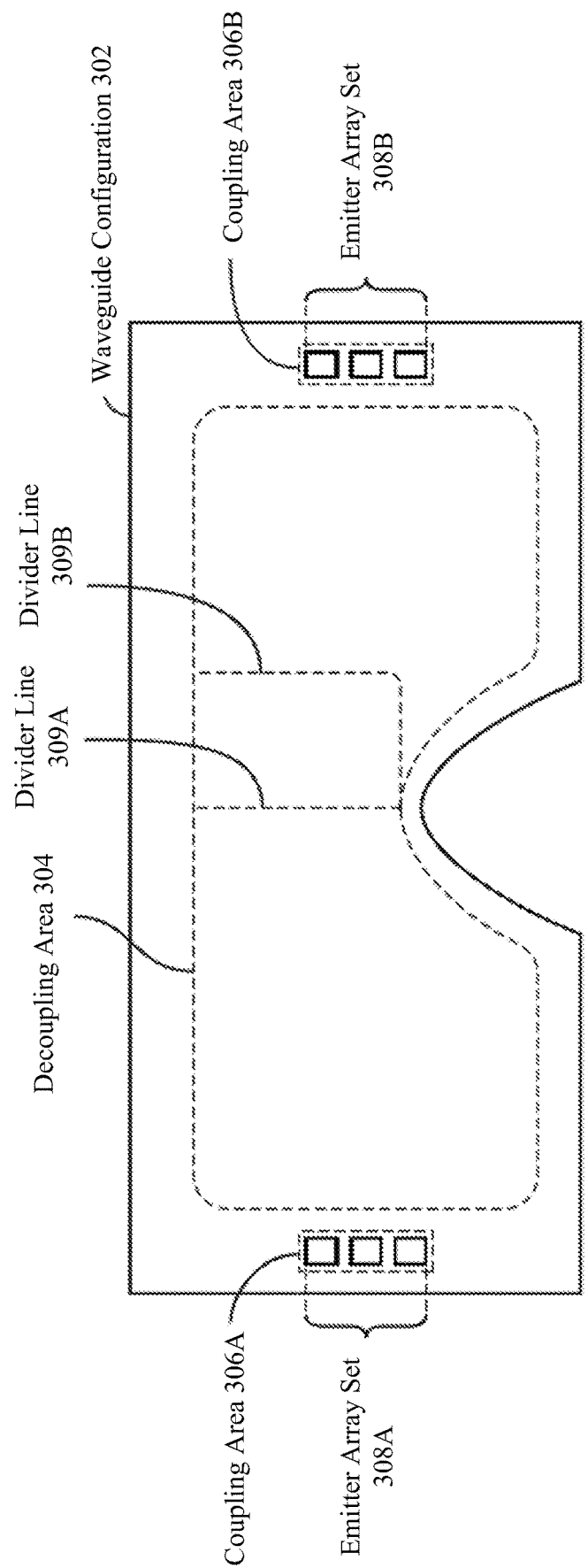
FIG. 3A illustrates an example 2D micro-LED waveguide display.

FIG. 2A illustrates an example scanning waveguide display 200A. In particular embodiments, the head-mounted display (HMD) of the AR/VR system may include a near eye display (NED) which may be a scanning waveguide display 200A. The scanning waveguide display 200A may include a light source assembly 210, an output waveguide 204, a controller 216, etc. The scanning waveguide display 200A may provide images for both eyes or for a single eye. For purposes of illustration, FIG. 3A shows the scanning waveguide display 200A associated with a single eye 202. Another scanning waveguide display (not shown) may provide image light to the other eye of the user and the two scanning waveguide displays may share one or more components or may be separated. The light source assembly 210 may include a light source 212 and an optics system 214. The light source 212 may include an optical component that could generate image light using an array of light emitters. The light source 212 may generate image light including, for example, but not limited to, red image light, blue image light, green image light, infra-red image light, etc. The optics system 214 may perform a number of optical processes or operations on the image light generated by the light source 212. The optical processes or operations performed by the optics systems 214 may include, for example, but are not limited to, light focusing, light combining, light conditioning, scanning, etc.

In particular embodiments, the optics system 214 may include a light combining assembly, a light conditioning assembly, a scanning mirror assembly, etc. The light source assembly 210 may generate and output an image light 219 to a coupling element 218 of the output waveguide 204. The output waveguide 204 may be an optical waveguide that could output image light to the user eye 202. The output waveguide 204 may receive the image light 219 at one or more coupling elements 218 and guide the received image light to one or more decoupling elements 206. The coupling element 218 may be, for example, but is not limited to, a diffraction grating, a holographic grating, any other suitable elements that can couple the image light 219 into the output waveguide 204, or a combination thereof. As an example and not by way of limitation, if the coupling element 350 is a diffraction grating, the pitch of the diffraction grating may be chosen to allow the total internal reflection to occur and the image light 219 to propagate internally toward the decoupling element 206. The pitch of the diffraction grating may be in the range of 300 nm to 600 nm. The decoupling element 206 may decouple the total internally reflected image light from the output waveguide 204. The decoupling element 206 may be, for example, but is not limited to, a diffraction grating, a holographic grating, any other suitable element that can decouple image light out of the output waveguide 204, or a combination thereof. As an example and not by way of limitation, if the decoupling element 206 is a diffraction grating, the pitch of the diffraction grating may be chosen to cause incident image light to exit the output waveguide 204. The orientation and position of the image light exiting from the output waveguide 204 may be controlled by changing the orientation and position of the image light 219 entering the coupling element 218. The pitch of the diffraction grating may be in the range of 300 nm to 600 nm.

In particular embodiments, the output waveguide 204 may be composed of one or more materials that can facilitate total internal reflection of the image light 219. The output waveguide 204 may be composed of one or more materials including, for example, but not limited to, silicon, plastic, glass, polymers, or some combination thereof. The output waveguide 204 may have a relatively small form factor. As an example and not by way of limitation, the output waveguide 204 may be approximately 50 mm wide along X-dimension, 30 mm long along Y-dimension and 0.5-1 mm thick along Z-dimension. The controller 216 may control the scanning operations of the light source assembly 210. The controller 216 may determine scanning instructions for the light source assembly 210 based at least on the one or more display instructions for rendering one or more images. The display instructions may include an image file (e.g., bitmap) and may be received from, for example, a console or computer of the AR/VR system. Scanning instructions may be used by the light source assembly 210 to generate image light 219. The scanning instructions may include, for example, but are not limited to, an image light source type (e.g., monochromatic source, polychromatic source), a scanning rate, a scanning apparatus orientation, one or more illumination parameters, or some combination thereof. The controller 216 may include a combination of hardware, software, firmware, or any suitable components supporting the functionality of the controller 216.

Figure 2B:
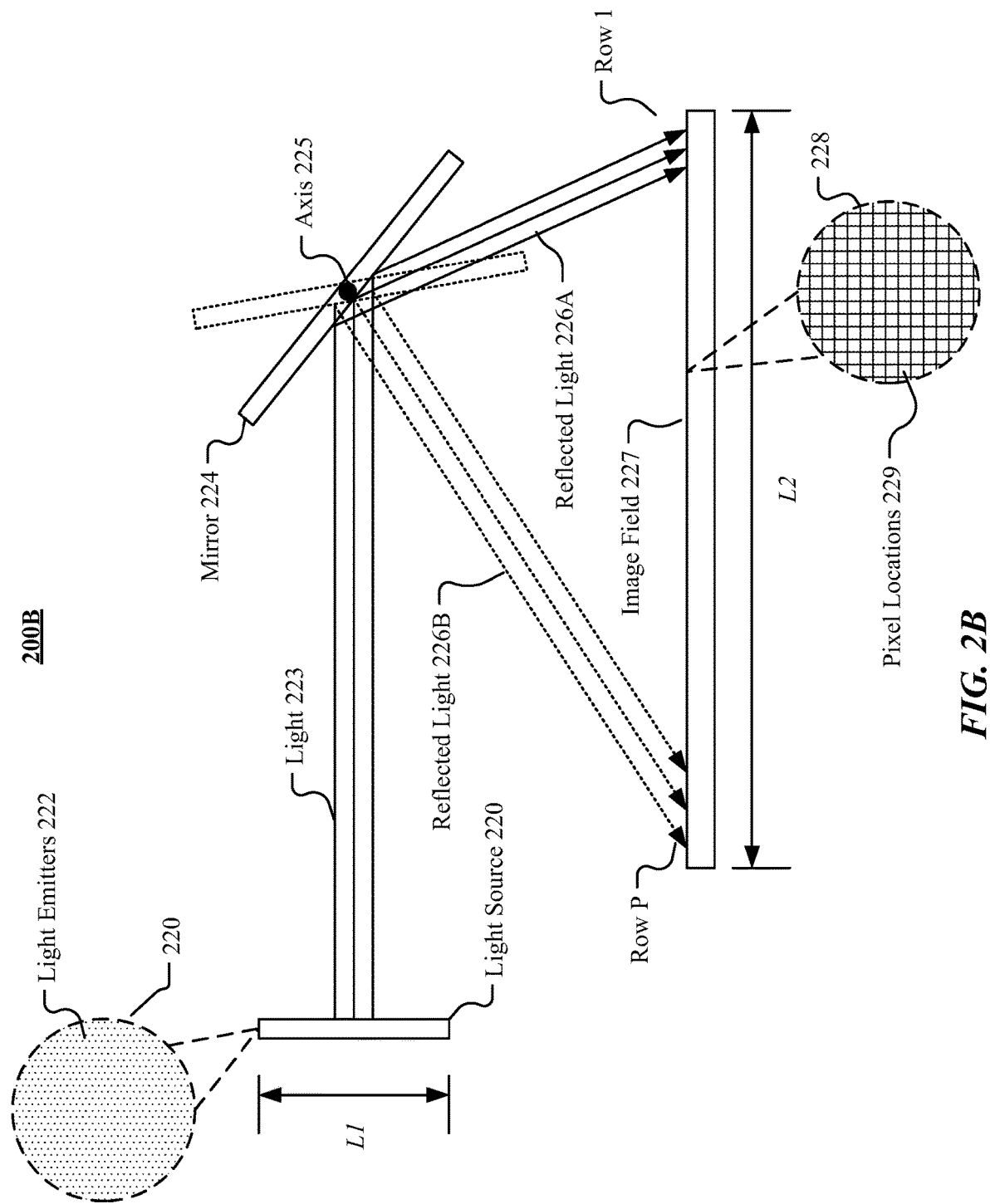
FIG. 2B illustrates an example scanning operation of the scanning waveguide display.

FIG. 2B illustrates an example scanning operation of a scanning waveguide display 200B. The light source 220 may include an array of light emitters 222 (as represented by the dots in inset) with multiple rows and columns. The light 223 emitted by the light source 220 may include a set of collimated beams of light emitted by each column of light emitters 222. Before reaching the mirror 224, the light 223 may be conditioned by different optical devices such as the conditioning assembly (not shown). The mirror 224 may reflect and project the light 223 from the light source 220 to the image field 227 by rotating about an axis 225 during scanning operations. The mirror 224 may be a microelectromechanical system (MEMS) mirror or any other suitable mirror. As the mirror 224 rotates about the axis 225, the light 223 may be projected to a different part of the image field 227, as illustrated by the reflected part of the light 226A in solid lines and the reflected part of the light 226B in dash lines.

In particular embodiments, the image field 227 may receive the light 226A-B as the mirror 224 rotates about the axis 225 to project the light 226A-B in different directions. For example, the image field 227 may correspond to a portion of the coupling element 218 or a portion of the decoupling element 206 in FIG. 2A. In particular embodiments, the image field 227 may include a surface of the coupling element 206. The image formed on the image field 227 may be magnified as light travels through the output waveguide 220. In particular embodiments, the image field 227 may not include an actual physical structure but include an area to which the image light is projected to form the images. The image field 227 may also be referred to as a scan field. When the light 223 is projected to an area of the image field 227, the area of the image field 227 may be illuminated by the light 223. The image field 227 may include a matrix of pixel locations 229 (represented by the blocks in inset 228) with multiple rows and columns. The pixel location 229 may be spatially defined in the area of the image field 227 with a pixel location corresponding to a single pixel. In particular embodiments, the pixel locations 229 (or the pixels) in the image field 227 may not include individual physical pixel elements. Instead, the pixel locations 229 may be spatial areas that are defined within the image field 227 and divide the image field 227 into pixels. The sizes and locations of the pixel locations 229 may depend on the projection of the light 223 from the light source 220. For example, at a given rotation angle of the mirror 224, light beams emitted from the light source 220 may fall on an area of the image field 227. As such, the sizes and locations of pixel locations 229 of the image field 227 may be defined based on the location of each projected light beam. In particular embodiments, a pixel location 229 may be subdivided spatially into subpixels (not shown). For example, a pixel location 229 may include a red subpixel, a green subpixel, and a blue subpixel. The red, green and blue subpixels may correspond to respective locations at which one or more red, green and blue light beams are projected. In this case, the color of a pixel may be based on the temporal and/or spatial average of the pixel's subpixels.

In particular embodiments, the light emitters 222 may illuminate a portion of the image field 227 (e.g., a particular subset of multiple pixel locations 229 on the image field 227) with a particular rotation angle of the mirror 224. In particular embodiment, the light emitters 222 may be arranged and spaced such that a light beam from each of the light emitters 222 is projected on a corresponding pixel location 229. In particular embodiments, the light emitters 222 may include a number of light-emitting elements (e.g., micro-LEDs) to allow the light beams from a subset of the light emitters 222 to be projected to a same pixel location 229. In other words, a subset of multiple light emitters 222 may collectively illuminate a single pixel location 229 at a time. As an example and not by way of limitation, a group of light emitter including eight light-emitting elements may be arranged in a line to illuminate a single pixel location 229 with the mirror 224 at a given orientation angle.

In particular embodiments, the number of rows and columns of light emitters 222 of the light source 220 may or may not be the same as the number of rows and columns of the pixel locations 229 in the image field 227. In particular embodiments, the number of light emitters 222 in a row may be equal to the number of pixel locations 229 in a row of the image field 227 while the light emitters 222 may have fewer columns than the number of pixel locations 229 of the image field 227. In particular embodiments, the light source 220 may have the same number of columns of light emitters 222 as the number of columns of pixel locations 229 in the image field 227 but fewer rows. As an example and not by way of limitation, the light source 220 may have about 1280 columns of light emitters 222 which may be the same as the number of columns of pixel locations 229 of the image field 227, but only a handful rows of light emitters 222. The light source 220 may have a first length L1 measured from the first row to the last row of light emitters 222. The image field 530 may have a second length L2, measured from the first row (e.g., Row 1) to the last row (e.g., Row P) of the image field 227. The L2 may be greater than L1 (e.g., L2 is 50 to 10,000 times greater than L1).

In particular embodiments, the number of rows of pixel locations 229 may be larger than the number of rows of light emitters 222. The display device 200B may use the mirror 224 to project the light 223 to different rows of pixels at different time. As the mirror 520 rotates and the light 223 scans through the image field 227, an image may be formed on the image field 227. In some embodiments, the light source 220 may also has a smaller number of columns than the image field 227. The mirror 224 may rotate in two dimensions to fill the image field 227 with light, for example, using a raster-type scanning process to scan down the rows then moving to new columns in the image field 227. A complete cycle of rotation of the mirror 224 may be referred to as a scanning period which may be a predetermined cycle time during which the entire image field 227 is completely scanned. The scanning of the image field 227 may be determined and controlled by the mirror 224 with the light generation of the display device 200B being synchronized with the rotation of the mirror 224. As an example and not by way of limitation, the mirror 224 may start at an initial position projecting light to Row 1 of the image field 227, and rotate to the last position that projects light to Row P of the image field 227, and then rotate back to the initial position during one scanning period. An image (e.g., a frame) may be formed on the image field 227 per scanning period. The frame rate of the display device 200B may correspond to the number of scanning periods in a second. As the mirror 224 rotates, the light may scan through the image field to form images. The actual color value and light intensity or brightness of a given pixel location 229 may be a temporal sum of the color various light beams illuminating the pixel location during the scanning period. After completing a scanning period, the mirror 224 may revert back to the initial position to project light to the first few rows of the image field 227 with a new set of driving signals being fed to the light emitters 222. The same process may be repeated as the mirror 224 rotates in cycles to allow different frames of images to be formed in the scanning field 227.

Figure 3B:
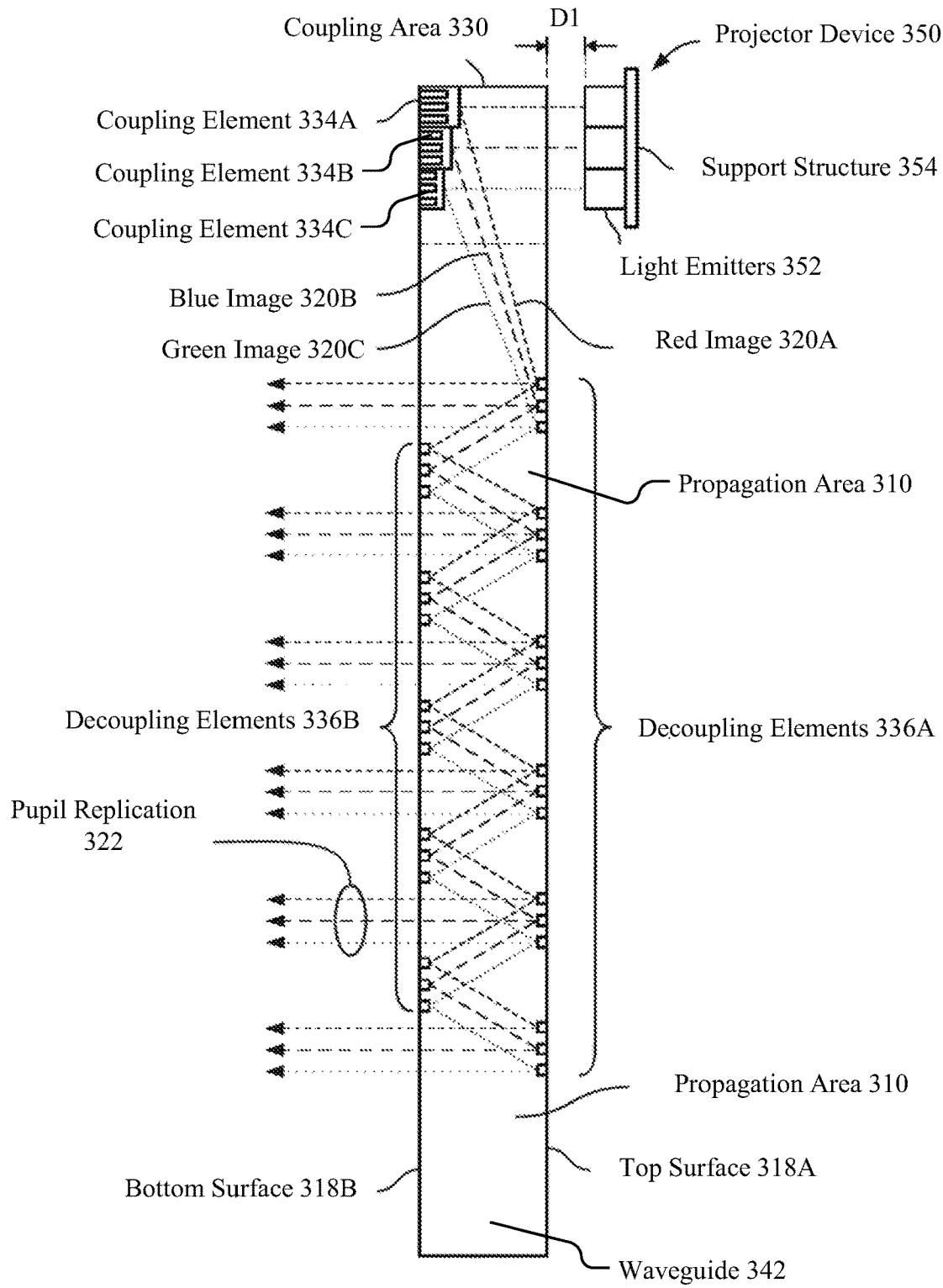
FIG. 3B illustrates an example waveguide configuration for the 2D micro-LED waveguide display.

FIG. 3A illustrates an example 2D micro-LED waveguide display 300A. In particular embodiments, the display 300A may include an elongate waveguide configuration 302 that may be wide or long enough to project images to both eyes of a user. The waveguide configuration 302 may include a decoupling area 304 covering both eyes of the user. In order to provide images to both eyes of the user through the waveguide configuration 302, multiple coupling areas 306A-B may be provided in a top surface of the waveguide configuration 302. The coupling areas 306A and 306B may include multiple coupling elements to receive image light from light emitter array sets 308A and 308B, respectively. Each of the emitter array sets 308A-B may include a number of monochromatic emitter arrays including, for example, but not limited to, a red emitter array, a green emitter array, and a blue emitter array. In particular embodiments, the emitter array sets 308A-B may further include a white emitter array or an emitter array emitting other colors or any combination of any multiple colors. In particular embodiments, the waveguide configuration 302 may have the emitter array sets 308A and 308B covering approximately identical portions of the decoupling area 304 as divided by the divider line 309A. In particular embodiments, the emitter array sets 308A and 308B may provide images to the waveguide of the waveguide configuration 302 asymmetrically as divided by the divider line 309B. For example, the emitter array set 308A may provide image to more than half of the decoupling area 304. In particular embodiments, the emitter array sets 308A and 308B may be arranged at opposite sides (e.g., 180° apart) of the waveguide configuration 302 as shown in FIG. 3B. In other embodiments, the emitter array sets 308A and 308B may be arranged at any suitable angles. The waveguide configuration 302 may be planar or may have a curved cross-sectional shape to better fit to the face/head of a user.

FIG. 3B illustrates an example waveguide configuration 300B for the 2D micro-LED waveguide display. In particular embodiments, the waveguide configuration 300B may include a projector device 350 coupled to a waveguide 342. The projector device 320 may include a number of light emitters 352 (e.g., monochromatic emitters) secured to a support structure 354 (e.g., a printed circuit board or other suitable support structure). The waveguide 342 may be separated from the projector device 350 by an air gap having a distance of D1 (e.g., approximately 50 μm to approximately 500 μm). The monochromatic images projected by the projector device 350 may pass through the air gap toward the waveguide 342. The waveguide 342 may be formed from a glass or plastic material. The waveguide 342 may include a coupling area 330 including a number of coupling elements 334A-C for receiving the emitted light from the projector device 350. The waveguide 342 may include a decoupling area with a number of decoupling elements 336A on the top surface 318A and a number of decoupling elements 336B on the bottom surface 318B. The area within the waveguide 342 in between the decoupling elements 336A and 336B may be referred as a propagation area 310, in which image light received from the projector device 350 and coupled into the waveguide 342 by the coupling element 334 may propagate laterally within the waveguide 342.

The coupling area 330 may include coupling elements (e.g., 334A, 334B, 334C) configured and dimensioned to couple light of predetermined wavelengths (e.g., red, green, blue). When a white light emitter array is included in the projector device 350, the portion of the white light that falls in the predetermined wavelengths may be coupled by each of the coupling elements 334A-C. In particular embodiments, the coupling elements 334A-B may be gratings (e.g., Bragg gratings) dimensioned to couple a predetermined wavelength of light. In particular embodiments, the gratings of each coupling element may exhibit a separation distance between gratings associated with the predetermined wavelength of light and each coupling element may have different grating separation distances. Accordingly, each coupling element (e.g., 334A-C) may couple a limited portion of the white light from the white light emitter array of the projector device 350 if white light emitter array is included in the projector device 350. In particular embodiments, each coupling element (e.g., 334A-C) may have the same grating separation distance. In particular embodiments, the coupling elements 334A-C may be or include a multiplexed coupler.

As illustrated in FIG. 3B, a red image 320A, a blue image 320B, and a green image 320C may be coupled by the coupling elements 334A, 334B, 334C, respectively, into the propagation area 310 and may begin to traverse laterally within the waveguide 342. A portion of the light may be projected out of the waveguide 342 after the light contacts the decoupling element 336A for one-dimensional pupil replication, and after the light contacts both the decoupling elements 336A and 336B for two-dimensional pupil replication. In two-dimensional pupil replication, the light may be projected out of the waveguide 342 at locations where the pattern of the decoupling element 336A intersects the pattern of the decoupling element 336B. The portion of the light that is not projected out of the waveguide 342 by the decoupling element 336A may be reflected off the decoupling element 336B. The decoupling element 336B may reflect all incident light back toward the decoupling element 336A. Accordingly, the waveguide 342 may combine the red image 320A, the blue image 320B, and the green image 320C into a polychromatic image instance which may be referred as a pupil replication 322. The polychromatic pupil replication 322 may be projected to the user's eyes which may interpret the pupil replication 322 as a full color image (e.g., an image including colors addition to red, green, and blue). The waveguide 342 may produce tens or hundreds of pupil replication 322 or may produce a single replication 322.

In particular embodiments, the AR/VR system may use scanning waveguide displays or 2D micro-LED displays for displaying AR/VR content to users. In order to miniaturize the AR/VR system, the display system may need to miniaturize the space for pixel circuits and may have limited number of available bits for the display. The number of available bits in a display may limit the display's color depth or gray scale level, and consequently limit the quality of the displayed images. Furthermore, the waveguide displays used for AR/VR systems may have nonuniformity problem cross all display pixels. The compensation operations for pixel nonuniformity may result in loss on image grayscale and further reduce the quality of the displayed images. For example, a waveguide display with 8-bit pixels (i.e., 256 gray level) may equivalently have 6-bit pixels (i.e., 64 gray level) after compensation of the nonuniformity (e.g., 8:1 waveguide nonuniformity, 0.1% dead micro-LED pixel, and 20% micro-LED intensity nonuniformity).

The AR/VR system may render and display a virtual surface having a particular level of details to a viewer based on the distance between the virtual surface and the viewer. When the viewer moves closer to the virtual surface in the virtual space, the system may need to re-render the virtual surface with a higher level of details. However, directly rendering and displaying the surface with a higher level of details may cause abrupt changes in the visual effect, and therefore, negatively affect user experience. In particular embodiments, the system may monitor the distance between the viewer to the displayed virtual surface. When the distance changes and meets a trigger condition (e.g., being within or beyond a threshold distance), the system re-render that surface with a higher level of details using a progressive transition process to create a smooth transition visual effect. For example, when the viewer moves closer to the surface and triggers the re-rendering process, the system may generate a target mesh surface with a higher level of details based on the viewer's current distance to the surface. The target mesh surface may be generated based on a mesh with a higher mesh density than the original mesh of the surface. Then, the system may generate an intermediate mesh surface which appears to be the same as the original mesh surface but has the same mesh density as the target mesh surface. The system may render and display the intermediate mesh surface and progressively transition the intermediate mesh surface into the target mesh surface during a pre-determined time period. By using the progressive transition process, particular embodiments of the system may generate a virtual effect with a smooth transition for re-rendering the virtual surface with a different level of details and may effectively eliminate the abrupt changes in visual effect.

In particular embodiments, the system may render a virtual surface (e.g., a surface of a virtual object) in a virtual space to a viewer. When the viewer moves closer or farer to the virtual surface, the system may need to re-render that surface with different levels of details. For example, when the viewer moves closer in the virtual space to the virtual surface, the system may need to re-render that surface with a higher level of details to allow the viewer to have more realistic visual result. As another example, when the viewer moves away in the virtual space from the surface, the system may need to re-render that surface with a lower level of details to save computational resources. In particular embodiments, the AR/VR system may subdivide the surface to be rendered into a number of subdivision areas. The system may generate a mesh, which includes a number of mesh grids or mesh areas (e.g., quadrilaterals, polygons, or triangles), corresponding to the subdivisions of that surface. In particular embodiments, the mesh surface as defined by the mesh may be used as a control surface for generating a smoother surface to render. In this disclosure, the term of "mesh surface" may refer to the surface naturally formed by the mesh areas of an associated mesh which includes a number of vertices, segment lines connecting these vertices, and mesh areas of particular shapes (e.g., polygons, quadrilaterals, triangles). In particular embodiments, the system may use a smooth algorithm to generate a smoother surface based on the control surface and render the smoother surface (instead of the mesh surface). The smooth algorithm may be repeatedly applied on the control surface until a limit surface (e.g., completely smooth surface) is reached. For example, a cubic shape may be turned into a sphere-like shape by repeatedly applying the smooth algorithm. This smoothing method may work well in some applications but may be less efficient to generate surfaces with different levels of details for many other applications.

In particular embodiments, the surface to be rendered may be defined by a mesh surface with a particular level of details (e.g., with a particular mesh density). The system may calculate the limit surface (i.e., the completely smoothed surface) based on the mesh surface and use the limit surface as the ideal target surface. In particular embodiments, the ideal target surface may be defined by a computer model (e.g., a 3D model) or a mathematical model, which could provide surface details at any levels. The system may use a tessellation algorithm to subdivide the target surface and generate a mesh including a number of mesh areas (e.g., polygons, quadrilaterals, triangles) corresponding to subdivision of the target surface. The mesh areas may together form a mesh surface as an approximate representation of the target surface. In particular embodiments, the system may directly render the mesh surface as the representation of the ideal target surface (instead of running a smooth algorithm on the mesh surface to generate a smoother surface). Although the mesh surface may not be identical to the ideal target surface, the difference may be controlled by the tessellation algorithm to be within a pre-determined threshold (e.g., no more than 1 pixel or 0.5 pixels) as viewed by the viewer from a current distance. The tessellation algorithm may determine the acceptable error level corresponding to the difference between the mesh surface and the ideal surface based on the current distance between the viewer and the surface, the viewpoint of the viewer, the field of view (FOV) of the viewer, etc. Then, the tessellation algorithm may determine whether to subdivide the surface into smaller patches based on the acceptable error level.

In particular embodiments, when the viewer moves closer to the surface, the system may subdivide the surface into smaller patches and use a tessellation algorithm and a library to generate a mesh with a higher density to create a mesh surface for representing a smoother version of the surface. The system may generate a denser mesh to represent a smoother surface each time when the system detect a trigger condition for re-rendering the surface with a higher level of details. For example, as the viewer moves around, the system may monitor the distance between the viewer and the surface and compare that distance to pre-determined threshold distances and use the comparison results as the trigger condition. Each time when a trigger condition is detected, the system may feed the original mesh, the current distance of viewer to the surface, the viewpoint and the field of view (FOV) of the user into the library to generate a denser mesh which has more mesh areas (e.g., triangles). The denser mesh may provide a better representation of the ideal surface as viewed by the viewer from the current distance. The difference of the newly generated mesh surface and the ideal target surface may be within the acceptable error range as determined by the tessellation algorithm based on the current distance between the viewer and the surface. The system may automatically determine the level of details that need to be included in a surface to be viewed from a particular distance and, upon detection of the trigger condition, generate the denser mesh surface as a representation of the smoother surface.

In particular embodiments, the ideal target surface may be defined by an initial mesh, a computer model or a mathematical model. The system may use a graphic pipeline (e.g., a tessellation algorithm or/and a library) to generate the virtual surface based on the initial mesh or the associated model. For example, the system may use a library and a tessellation algorithm to generate a mesh, which may have a number of vertices associated with a number of mesh areas (e.g., polygons, quadrilaterals, or triangles), to create a mesh surface as a representation of the ideal target surface. In particular embodiments, the mesh may be generated based on a number of factors including, for example, but not limited to, a distance from the viewer to the surface, a viewpoint of the viewer, a field of view of the viewer, available computational resources, etc. For example, the mesh density (or the number of mesh areas per unit area) may be determined based on the distance between the viewer to the surface using one or more heuristic rules. The heuristics rules may be used in the tessellation process to determine the level of details that should be included in a surface to be viewed from particular distances.

In particular embodiments, when the viewer moves around, the system may constantly re-generate the mesh surface based on the three-dimensional model using the graphic pipeline (e.g., a tessellation algorithm or/and a library) and automatically update the mesh surface with different levels of details. The system may generate different version of meshes (e.g., with different mesh densities) from the three-dimensional model and select the mesh with appropriate densities for generating the mesh surface with appropriate level of details. Ideally, the system may re-render and update the mesh surface for each frame of the displayed frames. However, re-rendering the mesh surface for each frame may consume too much computation resources (e.g., battery life, available memory space, CPU loads) and therefore, negatively affect the system performance and efficiency. To solve this problem, in particular embodiments, the system may re-render the mesh surface with different levels of details only upon detection of one or more trigger conditions (e.g., when the viewer moves closer or farer to the surface with a distance being smaller or greater than a pre-determined threshold).

In particular embodiments, the system may render and display a virtual surface to a viewer and re-render at least a portion of that virtual surface with a different level of details in response to detection of one or more trigger conditions. As an example and not by way of limitation, the system may compare the distance between the viewer and the surface to one or more threshold distances to detect the trigger condition. When the viewer moves closer to the surface, the system may detect a trigger condition by determining that the distance between the viewer and the surface is equal to or smaller than a first pre-determined threshold distance. In response to that trigger condition, the system may re-render the surface with a higher level of details. As another example, when the viewer moves farer from the surface, the system may compare the distance between the viewer and the surface to a second pre-determined threshold. In response to a determination that the distance is equal to or greater than the second pre-determined threshold distance, the system may re-render the surface with a lower level of details. In particular embodiments, the system may determine a number of threshold distances each being associated with a particular level of details. Each time the distance between the viewer and the surface crosses a particular threshold distance, the system may re-render the surface with a different level of details associated with that particular threshold distance. In particular embodiments, the system may re-render the surface with a different level of details in response to detection of one or more user inputs. As an example and not by way of limitation, the system may re-render the surface with a different level of details in response to detection a controller input (e.g., a controller button or a controller knob for zooming in/out). In particular embodiments, the system may use one or more heuristic rules for determining threshold distances for triggering the re-rendering process.

Figure 4:
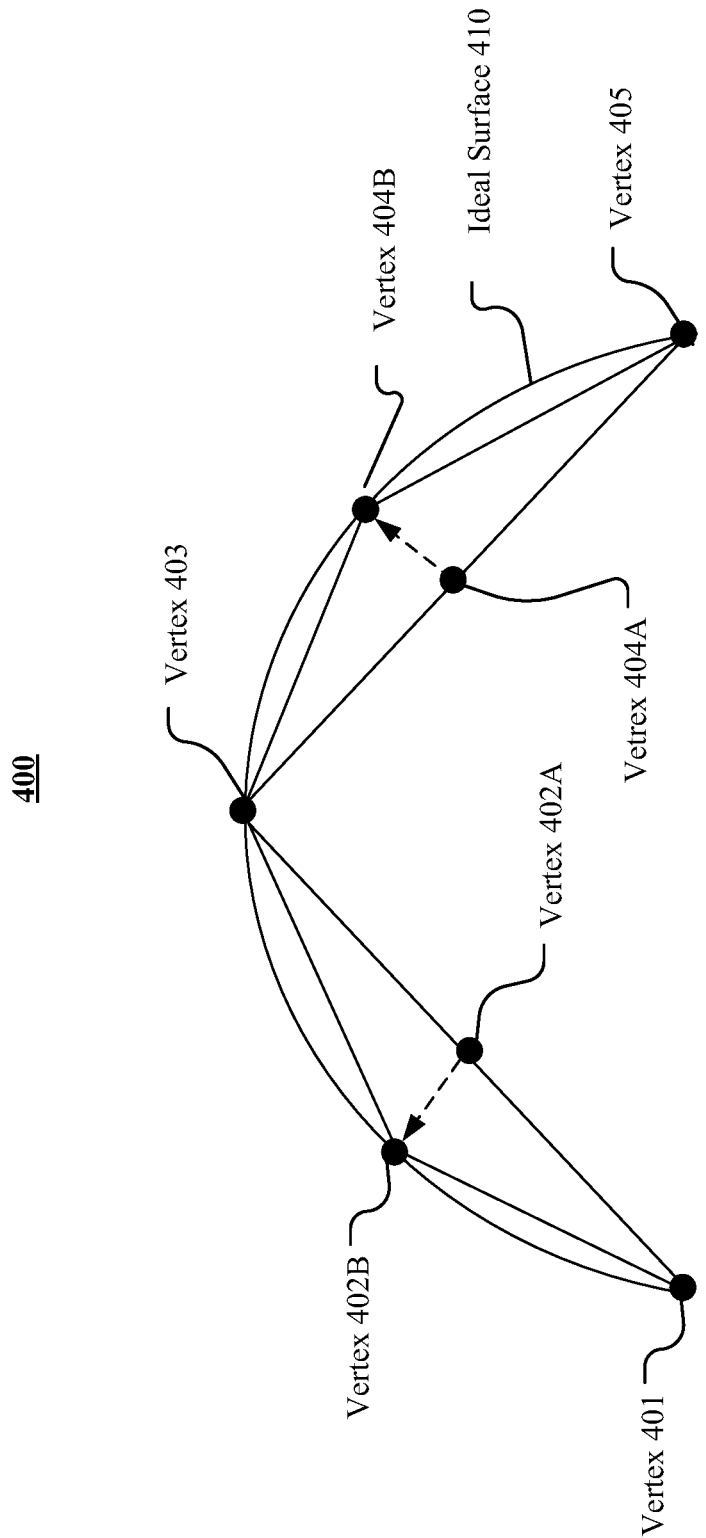
FIG. 4 illustrates an example process for re-rendering a surface with a higher level of details using a progressive transition process.

FIG. 4 illustrates an example process 400 for re-rendering a surface with a higher level of details using a progressive transition process. In particular embodiments, the surface that needs to be rendered may be described by an ideal target surface (e.g., 410). In particular embodiments, the ideal target surface may be characterized or defined by a limit surface of a mesh surface, a three-dimensional computer model, or a mathematical model. The limited surface or the associated model may define the contour of the object associated with the ideal target surface (e.g., 410) to be rendered. To render and display the surface using computer graphic techniques, the system may generate a mesh having a number of vertices and a number of mesh areas (e.g., polygons, quadrilaterals, triangles) and use the mesh surface corresponding to that mesh as the representation of the surface. Each mesh area may correspond to a subdivision area of the surface. The mesh may have a particular mesh density and a particular number of mesh areas depending on the level of details that need to be included in the surface. The system may determine the level of details that need to be included based on the distance of the viewer to that surface in the virtual space, the viewpoint and field of view of the viewer, and the available computational resources (e.g., battery life, memory space, CPU resources). The system may determine the mesh density based on the level of details that need to be included in the surface. After the mesh density has been determined, the system may use the computer graphic pipeline (e.g., a re-tessellation algorithm or/and a library) to generate the mesh with that particular mesh density and use the mesh surface of that mesh as the representation of the ideal target surface.

As an example and not by way of limitation, for a first distance between the viewer and the surface 410, the system may generate a first mesh which is associated with the vertices of 401, 403, and 405 and render the corresponding mesh surface as a representation of the ideal target surface 410. Although the mesh surface of the first mesh is not identical to the ideal target surface, the difference may be controlled by the tessellation algorithm to be within a predetermined error range (e.g., 1 pixel, 0.5 pixels) as viewed from the first distance. The system may determine the mesh density for the first mesh based on the distance between the viewer and the surface. The mesh density may allow the difference between the mesh surface of the first mesh and the ideal target surface 410 to be within the pre-determined error range. When the user moves closer to the surface 410 and is at a second distance to the surface, the system may need to re-render the surface 410 with a higher level of details. The system may use a tessellation algorithm and a library to generate a second mesh, which is associated with the vertices of 401, 402B, 403, 404B, and 405. The second mesh may have a higher mesh density than the first mesh (e.g., having twice as many mesh areas as the first mesh). And, the second mesh may include all the vertices of the first mesh but have more vertices than the first mesh. The vertices of the first mesh may be aligned with the first mesh surface and all vertices of the second mesh may be aligned with the second mesh surface. The system may use the mesh surface of the second mesh which has a higher density as the representation of the target surface with a higher level of details.

In particular embodiments, instead of directly rendering and displaying the target mesh surface, which could cause an abrupt change to the viewer (e.g., also referred as a "pop"), the system may generate and render an intermediate mesh surface based on an intermediate mesh, which is associated with the vertices of 401, 402A, 403, 404A, and 405. In particular embodiments, the intermediate mesh may have the same mesh density, the same number of vertices, and the same number of mesh areas as the target mesh. The intermediate mesh may include all vertices of the original mesh (i.e., the first mesh) and some new vertices that are generated based on interpolation of associated vertices of the original mesh (instead of being generated based on the library and the three-dimensional model of the surface). For example, the vertex 402A may be determined based on a linear interpolation of the vertices 401 and 403 and therefore, may be aligned with the original mesh surface. The vertex 404A may be determined based on a linear interpolation of the vertices of 403 and 405. Each vertex (e.g., 402A, 404A) may be associated with one or more attributes (e.g., position coordinates of the vertex, an associated normal with respect to the surface, lighting conditions). These attributes may be determined based on the linear interpolation of attributes of respective vertices of the original mesh. For example, the attributes associated with the vertex 402A may be determined based on the attributes of the vertices 401 and 403. The attributes associated with the vertex 404A may be determined based on linear interpolation of the attributes associated with the vertices 403 and 405.

Because the intermediate mesh is generated based on linear interpolation of the original mesh, the new vertices (e.g., 402A, 404A) of the intermediate mesh may be aligned with the original mesh surface. Therefore, the intermediate mesh surface may appear to the same as the original mesh surface. Instead of immediately rendering and displaying the target mesh surface upon detection of the trigger condition, the system may first render and display the intermediate mesh surface which appears the same as the original mesh surface. Then, the system may progressively transition the intermediate mesh surface into the target mesh surface during a pre-determined period time (e.g., 0.3 seconds, 0.5, seconds, 0.7, seconds, 1 second etc.). In particular embodiments, the system may allow the content creators (e.g., game developers or designers) to set the time duration for the progressive transition process.

Figure 5:
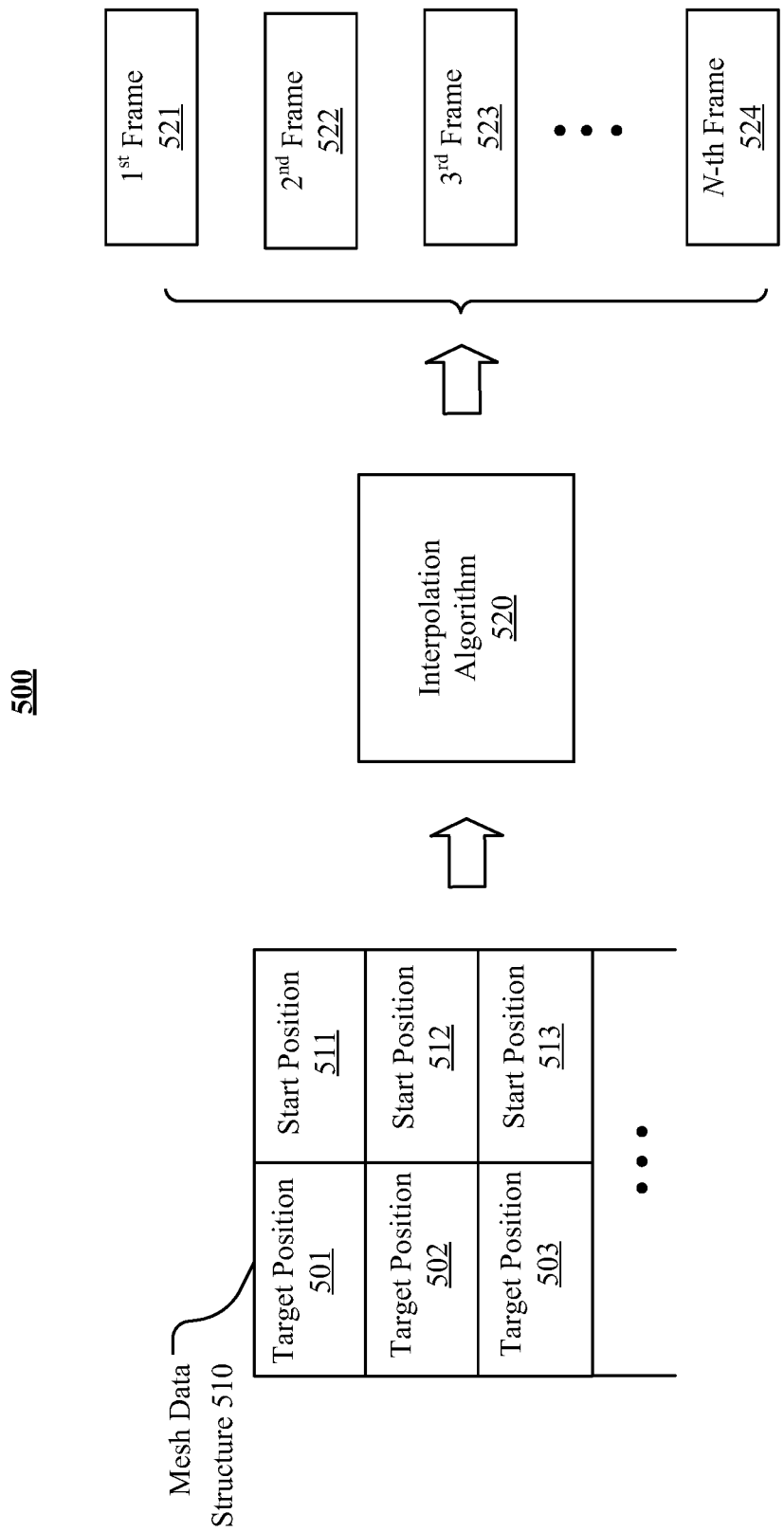
FIG. 5 illustrates an example process for using a mesh data structure and an interpolation algorithm to generate a number of intermediate frames for a progressive transition process.

FIG. 5 illustrates an example process 500 for using a mesh data structure and an interpolation algorithm to generate a number of intermediate frames for a progressive transition process. In particular embodiments, the system may render and display the intermediate mesh surface, which appears the same as the original mesh surface, and progressively transition the intermediate mesh surface into the target mesh surface to generate a visual effect with smooth transition process. In particular embodiments, the functionality for the progressive transition visual effect may be implemented in the tessellation algorithm. In particular embodiments, the system may generate a mesh data structure storing the starting position and corresponding target position of each vertex of the intermediate mesh that are currently aligned with the original mesh surface and need to be moved onto the target mesh surface. As an example and not by way of limitation, the system may render and display a first mesh surface corresponding to a first mesh to be viewed from a first distance. When the viewer moves closer to the surface and triggers the re-rendering process, the system may use the tessellation algorithm to generate a second mesh with a higher mesh density to create a mesh surface with a higher level of details. The second mesh may include all the vertices of the first mesh and some new vertices that provides a higher level of details of the surface. The system may generate a mesh data structure 510 to store the second mesh. The mesh data structure 510 may store each and every vertex and associated attributes (e.g., position, normal, lighting) of the second mesh. Then, the system may pass to the mesh data structure 510 new information including the starting positions of new vertices and associated attributes (e.g., normal, lighting). The starting positions of the new vertices may be determined based on linear interpolation of the corresponding vertices of the first mesh. The attributes associated with the new vertices may be determined based on linear interpolation on the attributes associated with the corresponding vertices of the first mesh. Each new vertex may be associated with a starting position and a target position and each position may be associated with a normal and a lighting condition. The mesh data structure 510 may store all starting positions (e.g., 501, 502, and 503) and all corresponding target positions (e.g., 511, 512, and 513) and associated attributes (e.g., normal and lighting) for all new vertices.

In particular embodiments, the system may feed the mesh data structure 510 to a linear interpolation algorithm 520 to generate a series of or a sequence of intermediate frames (e.g., $1^{st}$ frame 521, $2^{nd}$ frame 522, $3^{rd}$ frame 523, N-th frame 524) for the progressive transition process. In particular embodiments, the sequence of frames may depict the virtual surface undergoing a progressive transition process using a progressively-changing mesh with progressively-changing vertices that correspond to new vertices of the second mesh. The progressively-changing vertices may progressively move from respective starting positions to respective target positions during the progressive transition process. The virtual surface as depicted by the sequence of frames may have a higher level of details than the virtual surface as rendered based on the first mesh. Each of the sequence of frames may be displayed at a particular time point during the transition process time period to create the progressive transition process. In particular embodiments, the system may generate a series of intermediate meshes for respective frames of the sequence of intermediate frames. Each intermediate mesh and its corresponding mesh surface may be associated with an intermediate frame. In particular embodiments, the progressive transition process may be implemented without explicitly generating the series of intermediate meshes. For example, system may feed the mesh data structure 510 to the linear interpolation algorithm 520 to directly generate a sequence of intermediate frames each corresponding to an intermediate mesh surface based on the starting positions and target positions of the new vertices and a series of time points of the transition time period. In particular embodiments, the interpolation algorithm 520 may a shader algorithm.

In particular embodiments, for each new vertex that needs to progressively move from its starting position to corresponding target position, each intermediate frame may be associated with a position of that vertex for an associated time point. In particular embodiments, the vertex position at time t may be determined by the interpolation algorithm using the following equation:

$$p=\text{lerp}(p_s, p_t, t) \tag{1}$$

where, p is the position of the vertex at time t, $p_s$ is the starting position of that vertex, $p_t$ is the target position of that vertex. In particular embodiments, the normal associated with that vertex at time t may be determined by the interpolation algorithm using the following equation:

$$n=\text{lerp}(n_s, n_t, t) \tag{2}$$

where, n is the normal of the vertex at time t, $n_s$ is the normal associated with the starting position of that vertex, $n_t$ is the normal associated with the target position of that vertex. In particular embodiments, the system may use the interpolation algorithm to determine a series of positions for each new vertex based on the starting position, the target position, and a series of time points of the progressive transition time period. Each intermediate mesh may be associated with a particular position for each new vertex at the corresponding time point. Thus, each intermediate mesh surface may progressively deviate from the original mesh surface and have a closer appearance to the target mesh surface. The system may sequentially render and display the series of intermediate mesh surfaces corresponding to the sequence of intermediate frames at corresponding time points during the pre-determine time duration to create the progressive transition process. As a result, the system may generate a smooth transition visual effect for re-rendering the surface with a different level of details.

In particular embodiments, the system may determine a vector for each new vertex stating from the start position of that vertex, which is aligned with the original mesh surface, pointing to the target position of that vertex, which is aligned with the target mesh surface. As an example and not by way of limitation, as shown in FIG. 4, the system may determine a first vector for the vertex 402B. The vector may start from the position corresponding to the vertex 402A, which is aligned with the original mesh surface, and point to the position of the vertex 402B, which is on the target mesh surface. As another example, the system may determine a second vector for the vertex 404B. The vector may start from the position corresponding to the vertex 404A, which is aligned with the original mesh surface, and point to the position of the vertex 404B, which is on the target mesh surface. In particular embodiments, for the progressive transition process, the system may progressively move each new vertex along an associated vector from the vector starting position, which is on the intermediate mesh surface and aligned to the original mesh surface, to the end position of the vector. In particular embodiments, each new vertex may be moved along an associated vector based on absolute positions or relative positions of the starting position and target position. For example, the system may move the vertex 402B along the associated vector from the position of the vertex 402A to the position of the vertex 402B during the progressive transition progress of the pre-determined time duration (e.g., 0.5 seconds, 1 second). As another example, the system may move the vertex 404B along the associated vector from the position of the vertex 404A to the position of the vertex 404B during the progressive transition progress of the pre-determined time duration (e.g., 0.5 seconds, 1 second). By progressively moving each vertex of the intermediate mesh that are aligned with the original mesh surface to the corresponding vertex on the target mesh surface during the pre-determined time period, the system may generate a smooth transition virtual effect from the original mesh surface to the target mesh surface without any abrupt changes or "pop" effects for the re-rendering process.

In particular embodiments, different portions of a virtual surface displayed to the viewer may have essentially the same distance to the viewer. The system may render and display that virtual surface with the same level of details across the whole surface area based on a mesh having a uniform mesh density. When the viewer moves closer to or farer from the virtual surface, the system may re-render the whole surface or at least one portion of the surface with a second level of details different from the first level of details. For example, the virtual surface to be displayed at the first distance may be rendered based on a mesh having a first mesh density. The virtual surface to be displayed at a second distance from the viewer may be rendered based on a mesh having a second mesh density different from the first mesh density. The level of details to be included in a surface and the corresponding mesh density may be determined based on the distance between the surface and the viewer.

In particular embodiments, the system may need to render and display a large surface with different portions having different distances to the viewer. The portion that is closer to the viewer may need to be rendered and displayed to the viewer with a higher level of detail and the portion that is farer from the viewer may need to be rendered and displayed to the viewer with a lower level of details. The system may render this surface based on a mesh having non-uniform mesh densities across the surface area. As an example and not by way of limitation, a virtual ground surface (e.g., on which the viewer or the viewer's avatar is walking) or a curved wall surface (e.g., along which the viewer or the viewer's avatar is moving) may have different portions of the surface being at different distances to the viewer. When two portions of the surface have different distances to the viewer and that difference is greater than a threshold distance, the system may render these two portions of the surface with different levels of details. For example, the surface area that is within a threshold distance to the viewer's standing point may need to be rendered with a first level of details that is higher than the surface area that is beyond the threshold distance to the viewer's standing point. The system may determine a mesh density for each portion of a surface based on the distance of that portion to the viewer. Then, the system may generate a mesh that has non-uniform mesh densities across the mesh surface. In particular embodiments, the system may use the tessellation algorithm and the library to generate the non-uniform mesh which may have different mesh densities at different portions of the mesh. The system may allow the mesh to be updated per sub-portion or subdivision area based on respective distances.

In particular embodiments, the system may need to make a smooth transition from a first mesh to a second mesh where both the first and second meshes have non-uniform mesh densities. In other words, the first mesh and the second mesh may have different mesh densities in different sub-portions of respective meshes. The second mesh may have a higher mesh density than the first mesh in one or more sub-portions but may have a lower mesh density than the first mesh in one or more other sub-portions. Thus, the new vertices (with respect to the first mesh) of the second mesh may not clearly correspond to two neighboring vertices of the first mesh. As a result, it may not be efficient to determine the corresponding starting positions (which are on the first mesh) for these new vertices of the second mesh using the same method and process as described in FIG. 4.

Figure 6:
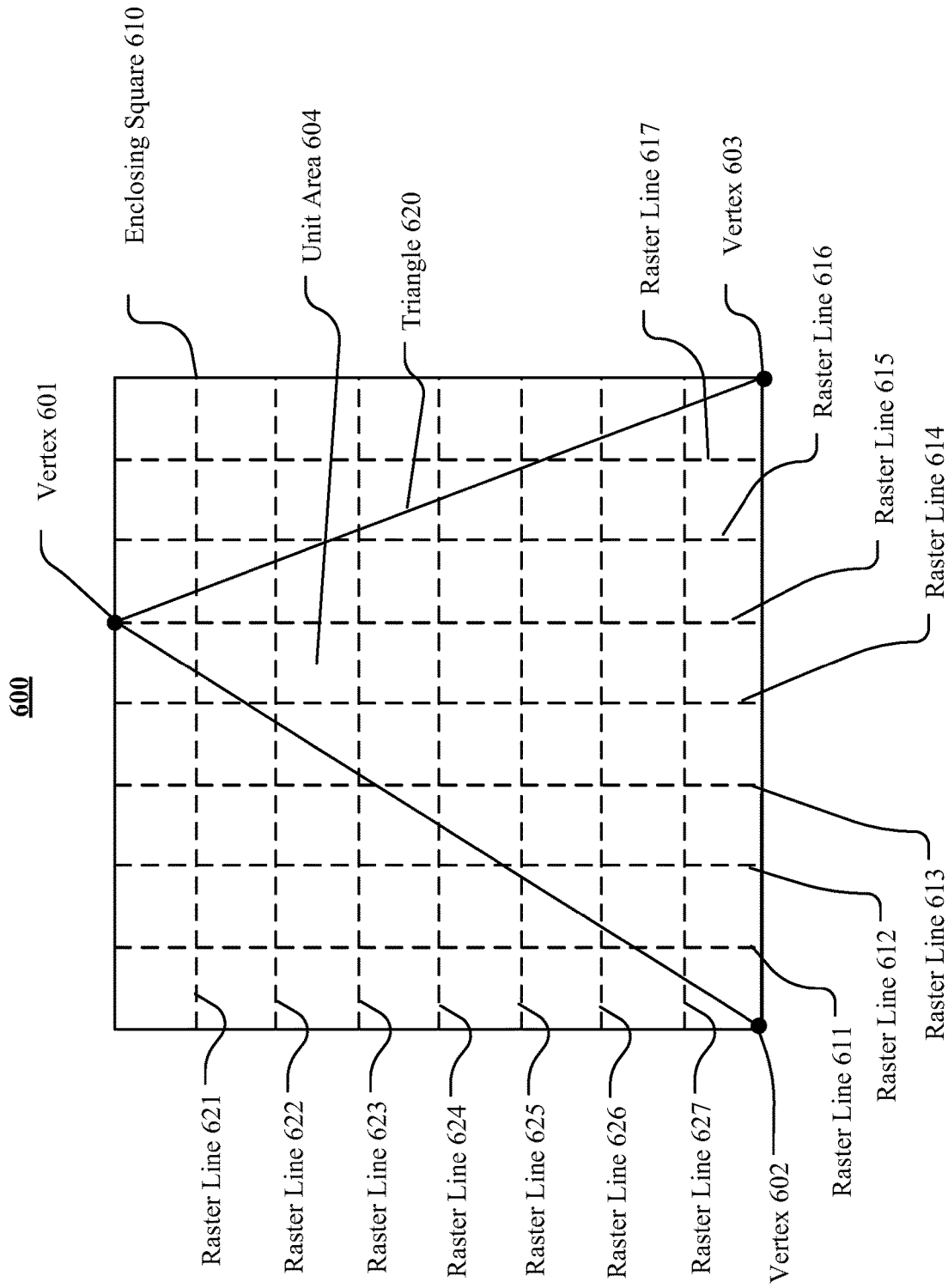
FIG. 6 illustrates an example process for using rasterization to determine starting positions for new vertices of a target mesh with an arbitrary subdivision pattern.

FIG. 6 illustrates an example process 600 for using rasterization to determine starting positions for new vertices of a target mesh with an arbitrary subdivision pattern. In particular embodiments, the system may use a rasterization process to efficiently determine the corresponding starting positions of the new vertices and use these starting positions to create a smooth transition from a first arbitrary mesh to a second arbitrary mesh. As an example and not by way of limitation, the system may need to render and display a large ground surface on which the viewer or the viewer's avatar is walking. The ground surface may be characterized or defined by a computer model or an initial mesh. Different portions of the ground surface may have different levels of details. The ground mesh may be rendered based on a mesh having different mesh densities at different sub-portions of the mesh. When the viewer is at a first distance to the surface, the surface may be rendered based on a first mesh which may be generated using a tessellation algorithm based on the initial mesh or the computer model of the surface. When the viewer moves to a second distance and triggers the re-rendering process (e.g., the viewer moves on the ground surface for a pre-determined distance), the system may use the tessellation algorithm to generate second mesh based on the initial mesh of the computer model of the surface. Both the first mesh and the second mesh may include a number of triangles (or quadrilaterals, polygons, etc.). The first mesh may have a first mesh area, that is close to the viewer (e.g., within a first threshold distance), having a relative higher mesh density and more triangles with respect to other mesh areas. The first mesh may have a second mesh area, that is farer to the viewer (e.g., beyond the first threshold distance), having a lower mesh density and less triangles with respect to the first mesh area. In contrast, the first mesh area of the second mesh may have relative low mesh density and less triangles than some other mesh areas. The second mesh area of the second mesh may have relative higher mesh density and more triangles than the first mesh area.

In particular embodiments, the system may rasterize each mesh area that is arbitrarily subdivided into smaller mesh areas in the target mesh and use the rasterization result of that mesh area to determine the starting positions (and other attributes, such as, normal, lighting, etc.) for the new vertices in the target mesh. As an example and not by way of limitation, the triangle 620 may be a mesh area that would be divided into a number of smaller triangles in the target mesh. The system may first find the smallest enclosing square or rectangle 610 that contains the triangle 620 and rasterize the enclosing square 610 into smaller areas using the raster lines (e.g., 621-627, 611-617). In particular embodiments, the system may rasterize the enclosing square into 8×8 units areas or 32×32 unit areas. For each unit area (e.g., 604) of the rasterized grid (8×8 grid or 32×32 grid), the system may first check whether that unit area (e.g., 604) falls within the triangle 620. When the unit area does fall within the triangle 620, the system may calculate the barycentric weight values for a position (e.g., center point of that unit area) of that unit area with respect to the three vertices 601, 602, and 603 of the triangle 620. Then, the system may use linear interpolation to calculate the attributes (e.g., position coordinates, normal, and lighting conditions) for that unit area based on the barycentric weight values and corresponding attributes (e.g., position coordinates, normal, and lighting conditions) of the three vertices 601, 602, and 603. After the triangles of the first mesh have been rasterized into smaller unit areas, the system may identify the unit area that corresponds to the new vertices of the target mesh based on the (U, V) coordinates of the new vertices of the target mesh. Then, the system may directly read the attribute values including, for example, position coordinates, normal, and lighting conditions from the identified unit area. The system may use the corresponding positions as the starting positions for the new vertices of the target mesh and pass the position data (with normal and lighting information) to the mesh data structure for the target mesh. Then, the system may feed the mesh data structure to a linear interpolation algorithm to generate a sequence of frames corresponding to a series of intermediate mesh surfaces based on the starting positions and the target positions of these new vertices. The system may display the series of frames during a pre-determined transition process time period to create a smooth transition visual effect from the first mesh surface to the target mesh surface.

In particular embodiments, the system may render a surface to a viewer based on a first mesh with a first mesh density determined based on the distance between the viewer and the surface. In response to a determination that the viewer moves away from a rendered surface for a pre-determined threshold distance, the system may need to re-render the surface with a lower level of details corresponding to a lower mesh density to reduce the computational resource usage. The system may use the tessellation algorithm to generate a target mesh with a lower mesh density based on the current distance of the viewer to the surface. The target mesh may have less vertices than the first mesh. Therefore, for transitioning from the first mesh surface to the second mesh surface, some vertices in the first mesh may need to be eliminated. If the system immediately switches to the target mesh surface having a lower level of details by directly eliminating these vertices, the viewer may see an abrupt change in the visual effect just like the scenario of immediately switching to the mesh surface with a higher level of details. In particular embodiments, the system may system may use a progressive transition process to transition from the first mesh surface to the target mesh surface.

In particular embodiments, the system may determine a corresponding target position on the target mesh for each vertex in the first mesh that needs to be eliminated in the target mesh. The corresponding target positions may be determined based on linear interpolation on vertices of the target mesh. For example, when the vertices of the first mesh with a higher mesh density have a clear corresponding relation to the vertices of the target mesh (e.g., similar to the relation as shown in FIG. 4), the target position for each vertex of the first mesh that needs to be eliminated may be determined based on linear interpolation of the associated vertices of the target mesh. As another example, when the vertices of the first mesh with a higher mesh density do not have a clear corresponding relation to the vertices of the target mesh (e.g., the first mesh includes arbitrary subdivision patterns with respect to the target mesh areas), the system may use a rasterization process (e.g., similar to the process as shown in FIG. 6) to determine the target positions of the eliminating vertices of the first mesh. In addition to the target positions, the system may determine other associated attributes including, for example, normal and lighting conditions, using linear interpolation during the same rasterization process. Then, the system may pass the target position data (together with associated normal and lighting information) to the mesh data structure storing the first mesh with the higher mesh density.

In the mesh data structure, each vertex of the first mesh, that needs to be eliminated, may be associated with a starting position (aligned on the first mesh surface) and a target position on the target mesh surface. The system may feed the data structure of the first mesh to an interpolation algorithm. The interpolation algorithm may generate a sequence of intermediate frames based on a series of intermediate meshes corresponding to a series of time points of the progressive transition time period. The interpolation algorithm may determine a series of intermediate positions for each vertex to be eliminated. Each intermediate mesh may be associated with a particular intermediate position, at the corresponding time point, for each vertex to be eliminated. The system may sequentially display the sequence of intermediate frames at respective time points during the progressive transition time period. During the progressive transition process, the vertices of the first mesh that need be eliminated in the target mesh may progressively move from their initial positions on the first mesh to respective target positions on the target mesh. As a result, the system may generate a smooth transition visual effect with a progressive transition process from the first mesh surface to the target mesh surface.

Figure 7:
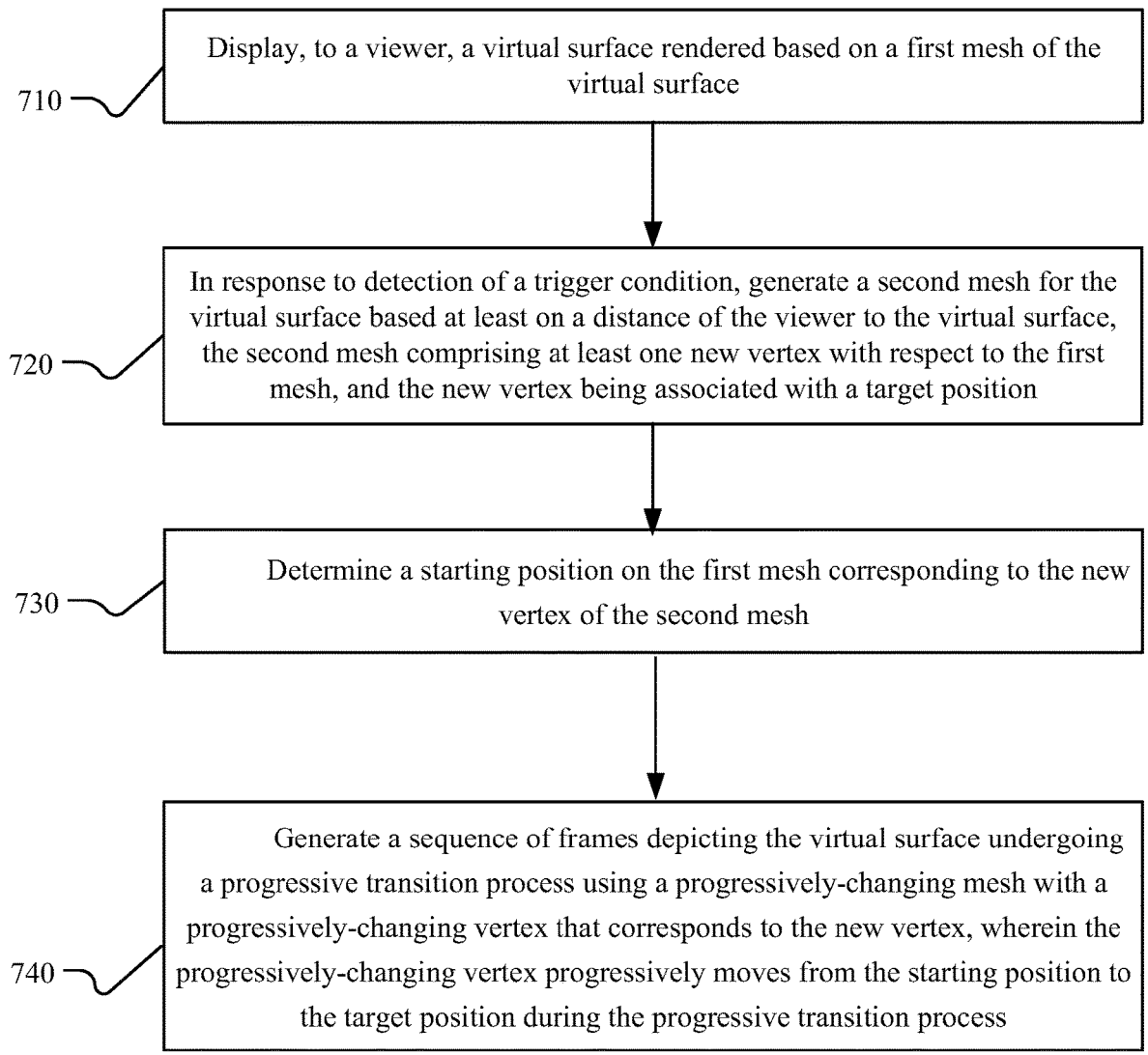
FIG. 7 illustrates an example method for re-rendering a surface with a higher level of details using a progressive transition process.

FIG. 7 illustrates an example method 700 for re-rendering a surface with a higher level of details using a progressive transition process. The method may begin at step 710, wherein a computing system may display, to a viewer, a virtual surface rendered based on a first mesh of the virtual surface. At step 720, in response to detection of a trigger condition, the system may generate a second mesh for the virtual surface based at least on a distance of the viewer to the virtual surface. The second mesh may include at least one new vertex with respect to the first mesh, and the new vertex may be associated with a target position. At step 730, the system may determine a starting position on the first mesh corresponding to the new vertex of the second mesh. At step 740, the system may generate a sequence of frames depicting the virtual surface undergoing a progressive transition process using a progressively-changing mesh with a progressively-changing vertex that corresponds to the new vertex. The progressively-changing vertex may progressively move from the starting position to the target position during the progressive transition process. In particular embodiments, the second mesh may be generated by a tessellation algorithm based on a viewpoint of the viewer, a field of view of the viewer, and a model associated with the virtual surface. In particular embodiments, the second mesh may have a higher mesh density than the first mesh in at least one mesh area. The virtual surface as depicted by the sequence of frames may have a higher level of details than the virtual surface as rendered based on the first mesh.

In particular embodiments, the trigger condition may be detected based on a comparison of a distance between the viewer and the virtual surface and a pre-determined threshold distance. In particular embodiments, the starting position for the new vertex of the second mesh may be determined based on linear interpolation on two or more of associated vertices of the first mesh. In particular embodiments, the system may determine one or more attributes associated with the starting position of the new vertex based on linear interpolation on respective attributes associated with the two or more associated vertices of the first mesh. The one or more attributes may include, for example, but are not limited to, a normal and a lighting condition. In particular embodiments, the system may generate a mesh data structure for the second mesh. The mesh data structure may include and store the starting position and the target position for the new vertex of the second mesh. The system may determine a series of intermediate positions for the new vertex based on interpolation on the starting position and the target position of the new vertex. Each frame of the sequence of frames may be associated with one of the series of intermediate positions and a time point of the progressive transition process. In particular embodiments, the system may display the sequence of frames to the viewer sequentially at respective time points during a predetermined time period for the progressive transition process. The displayed sequence of frames may create a visual effect of the progressive transition process.

In particular embodiments, a first mesh area of the first mesh may have a higher mesh density than a first corresponding mesh area of the second mesh. A second mesh area of the first mesh may have a lower mesh density than a second corresponding mesh area of the second mesh. In particular embodiments, the first mesh and the second mesh may include a number of triangles. A first triangle of the first mesh may correspond to a number of second triangles of the second mesh. The corresponding second triangles of the second mesh may correspond to an arbitrary division pattern to the first triangle. In particular embodiments, the system may rasterize an enclosing area containing the first triangle of the first mesh into a number of unit areas. The system may determine, for each unit area of the rasterized enclosing area, whether that unit area falls within the first triangle. When that unit area falls within the first triangle, the system may calculate barycentric weights for that unit area based on three vertices of the first triangle. In particular embodiments, the system may determine position coordinates for that unit area based on linear interpolation on position coordinates of the three vertices of the first triangle. The position coordinates for that unit area may be determined based on the barycentric weights of that unit area. In particular embodiments, the system may determine associated attributes for that unit area based on linear interpolation on attributes of the three vertices of the first triangle. The associated attributes for that unit area may be determined based on the barycentric weights of that unit area. In particular embodiments, the system may identify an associated unit area from a number of unit areas of the first triangle based on (U, V) coordinates of the new vertex of the second mesh. The starting position (which is on the first mesh) of the new vertex of the second mesh may be determined based on the position coordinates of the associated unit area.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for re-rendering a surface with a higher level of details using a progressive transition process including the particular steps of the method of FIG. 7, this disclosure contemplates any suitable method for re-rendering a surface with a higher level of details using a progressive transition process including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
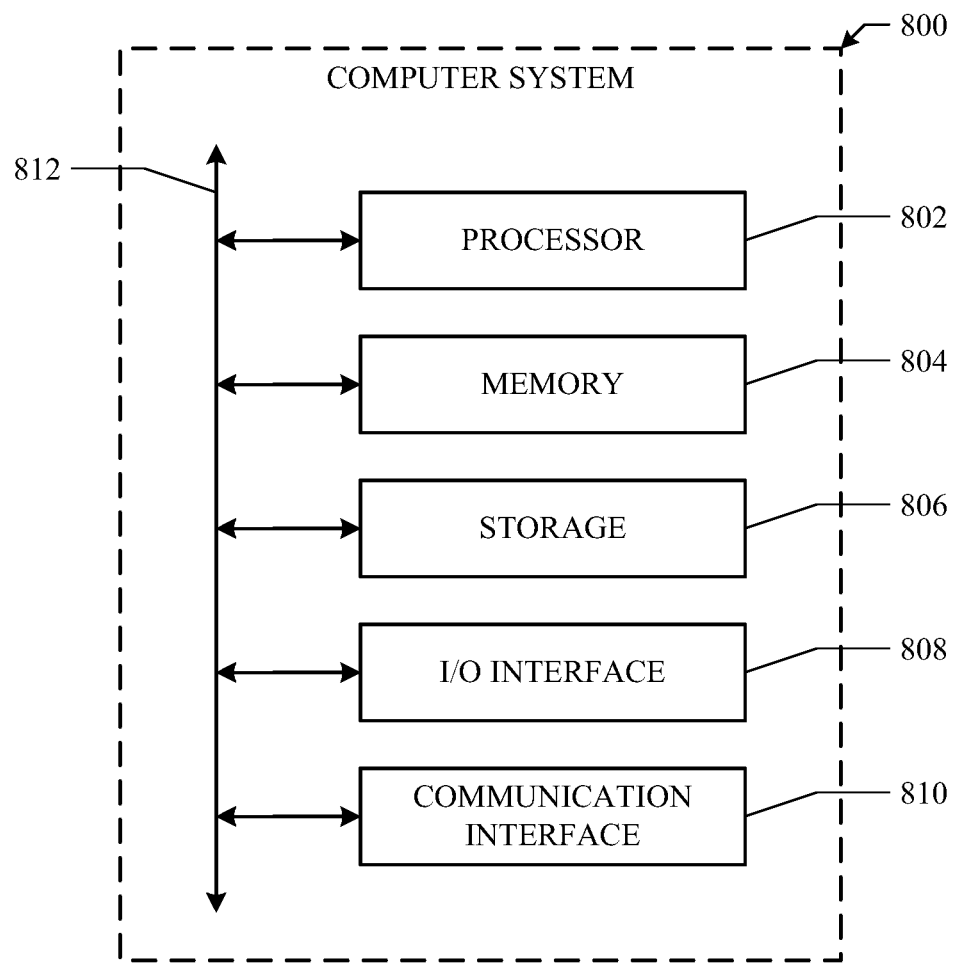
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
displaying, to a viewer, a virtual surface rendered based on a first mesh of the virtual surface;
in response to detection of a trigger condition, generating a second mesh for the virtual surface based at least on a distance of the viewer to the virtual surface, the second mesh comprising at least one new vertex with respect to the first mesh, and the new vertex being associated with a target position;
determining a starting position on the first mesh corresponding to the new vertex of the second mesh, wherein the starting position for the new vertex of the second mesh is determined based on linear interpolation on two or more associated vertices of the first mesh;
generating a sequence of frames depicting the virtual surface undergoing a progressive transition process using a progressively-changing mesh with a progressively-changing vertex that corresponds to the new vertex, wherein the progressively-changing vertex progressively moves from the starting position to the target position during the progressive transition process; and
determining one or more attributes associated with the starting position of the new vertex based on linear interpolation on respective attributes associated with the two or more associated vertices of the first mesh, wherein the one or more attributes comprise a normal and a lighting condition.

2. The method of claim 1, wherein the second mesh is generated by a tessellation algorithm based on a viewpoint of the viewer, a field of view of the viewer, and a model associated with the virtual surface.

3. The method of claim 1, wherein the second mesh has a higher mesh density than the first mesh in at least one mesh area, and wherein the virtual surface as depicted by the sequence of frames has a higher level of details than the virtual surface as rendered based on the first mesh.

4. The method of claim 1, wherein the trigger condition is detected based on a comparison of the distance between the viewer and the virtual surface and a pre-determined threshold distance.

5. The method of claim 1, further comprising:
generating a mesh data structure for the second mesh, wherein the mesh data structure comprises the starting position and the target position for the new vertex of the second mesh; and
determining a series of intermediate positions for the new vertex based on interpolation on the starting position and the target position of the new vertex, wherein each frame of the sequence of frames is associated with one of the series of intermediate positions and a time point of the progressive transition process.

6. The method of claim 1, further comprising:
displaying the sequence of frames to the viewer sequentially at respective time points during a predetermined time period for the progressive transition process, wherein the displayed sequence of frames create a visual effect of the progressive transition process.

7. The method of claim 1, wherein a first mesh area of the first mesh has a higher mesh density than a first corresponding mesh area of the second mesh, and wherein a second mesh area of the first mesh has a lower mesh density than a second corresponding mesh area of the second mesh.

8. The method of claim 1, wherein the first mesh and the second mesh comprise a plurality of triangles, wherein a first triangle of the first mesh corresponds to a plurality of second triangles of the second mesh, and wherein the plurality of second triangles correspond to an arbitrary division pattern to the first triangle.

9. The method of claim 8, further comprising:
rasterizing an enclosing area containing the first triangle of the first mesh into a plurality of unit areas;
determining, for each unit area of the plurality of unit areas, whether that unit area falls within the first triangle; and
in response to a determination that that unit area falls within the first triangle, calculating barycentric weights for that unit area based on three vertices of the first triangle.

10. The method of claim 9, further comprising:
determining position coordinates for that unit area based on linear interpolation on position coordinates of the three vertices of the first triangle, wherein the position coordinates for that unit area are determined based on the barycentric weights of that unit area.

11. The method of claim 10, further comprising:
identifying an associated unit area from the plurality of unit areas of the first triangle based on (U, V) coordinates of the new vertex of the second mesh, wherein the starting position on the first mesh for the new vertex of the second mesh is determined based on the position coordinates of the associated unit area.

12. The method of claim 9, further comprising:
determining associated attributes for that unit area based on linear interpolation on attributes of the three vertices of the first triangle, wherein the associated attributes for that unit area are determined based on the barycentric weights of that unit area.

13. One or more computer-readable non-transitory storage media embodying software that is operable when executed by a computing device to:
display, to a viewer, a virtual surface rendered based on a first mesh of the virtual surface;
in response to detection of a trigger condition, generate a second mesh for the virtual surface based at least on a distance of the viewer to the virtual surface, the second mesh comprising at least one new vertex with respect to the first mesh, and the new vertex being associated with a target position;
determine a starting position on the first mesh corresponding to the new vertex of the second mesh, wherein the starting position for the new vertex of the second mesh is determined based on linear interpolation on two or more associated vertices of the first mesh;
generate a sequence of frames depicting the virtual surface undergoing a progressive transition process using a progressively-changing mesh with a progressively-changing vertex that corresponds to the new vertex, wherein the progressively-changing vertex progressively moves from the starting position to the target position during the progressive transition process; and
determine one or more attributes associated with the starting position of the new vertex based on linear interpolation on respective attributes associated with the two or more associated vertices of the first mesh, wherein the one or more attributes comprise a normal and a lighting condition.

14. The media of claim 13, wherein the second mesh is generated by a tessellation algorithm based on a viewpoint of the viewer, a field of view of the viewer, and a model associated with the virtual surface.

15. The media of claim 13, wherein the trigger condition is detected based on a comparison of the distance between the viewer and the virtual surface and a pre-determined threshold distance.

16. A system comprising: one or more processors; and a memory coupled to the processors comprising instructions executable by the processors, the processors being operable when executing the instructions to:
  display, to a viewer, a virtual surface rendered based on a first mesh of the virtual surface;
  in response to detection of a trigger condition, generate a second mesh for the virtual surface based at least on a distance of the viewer to the virtual surface, the second mesh comprising at least one new vertex with respect to the first mesh, and the new vertex being associated with a target position;
  determine a starting position on the first mesh corresponding to the new vertex of the second mesh, wherein the starting position for the new vertex of the second mesh is determined based on linear interpolation on two or more associated vertices of the first mesh;
  generate a sequence of frames depicting the virtual surface undergoing a progressive transition process using a progressively-changing mesh with a progressively-changing vertex that corresponds to the new vertex, wherein the progressively-changing vertex progressively moves from the starting position to the target position during the progressive transition process; and
  determine one or more attributes associated with the starting position of the new vertex based on linear interpolation on respective attributes associated with the two or more associated vertices of the first mesh, wherein the one or more attributes comprise a normal and a lighting condition.

17. The system of claim 16, wherein the second mesh is generated by a tessellation algorithm based on a viewpoint of the viewer, a field of view of the viewer, and a model associated with the virtual surface.

18. The system of claim 16, wherein the trigger condition is detected based on a comparison of the distance between the viewer and the virtual surface.

* * * * *